United States Patent
Park

(10) Patent No.: US 12,038,362 B2
(45) Date of Patent: Jul. 16, 2024

(54) APPARATUS AND METHOD FOR VISCOSITY MEASUREMENTS USING A PORTABLE FIELD VISCOMETER

(71) Applicant: Noh A. Park, Norristown, PA (US)

(72) Inventor: Noh A. Park, Norristown, PA (US)

( * ) Notice: Subject to any disclaimer, the term of this patent is extended or adjusted under 35 U.S.C. 154(b) by 92 days.

(21) Appl. No.: 17/665,193

(22) Filed: Feb. 4, 2022

(65) Prior Publication Data

US 2022/0252495 A1     Aug. 11, 2022

Related U.S. Application Data

(60) Provisional application No. 63/146,460, filed on Feb. 5, 2021.

(51) Int. Cl.
　　*G01N 11/04* （2006.01）
　　*G01N 9/12* （2006.01）
　　*G01N 11/00* （2006.01）

(52) U.S. Cl.
　　CPC .............. *G01N 11/04* (2013.01); *G01N 9/12* (2013.01); *G01N 2011/0006* (2013.01); *G01N 2011/0026* (2013.01)

(58) Field of Classification Search
　　None
　　See application file for complete search history.

(56) References Cited

U.S. PATENT DOCUMENTS

| 4,637,250 | A |   | 1/1987  | Irvine, Jr. et al. |
| 4,852,388 | A | * | 8/1989  | Park ........... G01N 11/12 73/32 R |
| 5,327,778 | A | * | 7/1994  | Park ........... G01N 11/12 73/54.21 |
| 2009/0277264 | A1 | * | 11/2009 | Forkosh ....... G01F 23/686 73/453 |

(Continued)

OTHER PUBLICATIONS

Park, Noh A. et al. Application of the Falling Needle Viscometer. Archived from http://www.stonybrooksci.com/applicationnotes/fallingneedleviscometer/fallingneedleviscometer.htm (Year: 2008).*

(Continued)

*Primary Examiner* — Kristina M Deherrera
*Assistant Examiner* — Mark A Shabman
(74) *Attorney, Agent, or Firm* — Howard IP Law Group, PC

(57) ABSTRACT

An apparatus and method are disclosed for accurately determining viscosity of Newtonian and non-Newtonian fluids in the field or in-service by using a potable field viscometer. The portable field viscometer includes a vertical disposable (or reusable) sample insert tube filled with the liquid which the viscosity is to be determined. Using fins on the needle surface, a needle having a known density is made to fall through the liquid in the disposable (or reusable) sample insert tube coaxially. Using the time that the needle takes to fall between two known distance marks on the extension bar attached the top of the needle or transducers such as light, laser or magnetic, the velocity of the needle falling through (Continued)

the liquid is determined. Thus, the viscosity can be calculated by using the velocity of a needle. In the method, viscosity, shear rate and shear stress can be determined according to the disclosed method.

21 Claims, 11 Drawing Sheets

(56) References Cited

U.S. PATENT DOCUMENTS

| | | | |
|---|---|---|---|
| 2009/0277764 A1* | 11/2009 | Lin | H01H 17/22 200/336 |
| 2012/0186326 A1* | 7/2012 | Kawamura | G01N 11/12 73/12.01 |
| 2012/0186327 A1* | 7/2012 | Kawamura | G01N 11/12 73/12.06 |
| 2018/0136102 A1* | 5/2018 | Garrido Garza | G01N 9/14 |

OTHER PUBLICATIONS

G. G. Stokes, "On the Effect of the Internal Friction of Fluids on the Motion of Pendulums," Camb, Phil. Trans., 99 pages (Dec. 9, 1850).
Lohrentz, et al., "An Experimentally Verified Theoretical Study of the Falling Cylinder Viscometer," A. I. Ch. E. Journal, 6, No. 4, p. 547-549 (Dec. 1960).
G.S. Smith, "The Plunger Rheometer—Law of Flow for a Newtonian Liquid," J. Inst. Pet., 43, p. 227-230 (1957).
J. R. Van Wazer et al., "Viscosity and Flow Measurement,", Interscience Publishers, New York, p. 47-96 (1963).

* cited by examiner

APPARATUS AND METHOD FOR VISCOSITY MEASUREMENTS USING A PORTABLE FIELD VISCOMETER

CROSS-REFERENCE TO RELATED APPLICATIONS

This application claims priority benefit under 35 USC 119 to provisional patent application Ser. No. 63/146,460, filed on Feb. 5, 2021, the entire disclosure of which is incorporated by reference herein for all purposes

FIELD OF THE INVENTION

This invention relates to an apparatus and method for accurately determining the viscosity of Newtonian and non-Newtonian fluids by means of a portable field viscometer.

BACKGROUND

A fluid can generally be classified as ideal, Newtonian or non-Newtonian based on its behavior under stress. An ideal fluid has no shear stress in a flow field and its viscosity is zero. No fluids which exhibit this type of behavior in fact exist. In a Newtonian fluid, such as water and glycerol, the shear stress is directly proportional to the shear rate, and its viscosity is independent of the shear rate. In a non-Newtonian fluid, the shear stress is dependent on the shear rate, and its viscosity may vary with the shear rate in a complex manner.

Viscosity is a function of internal friction and of the behavior of a fluid under stress. Therefore, in order to improve the design of pumps, stirrers, mixers, liquid transport devices, and reactors, it is important to be able to accurately determine viscosity. Furthermore, because the molecular weight of a polymer solution is related to its viscosity at zero shear rate, an accurate determination of the zero shear rate viscosity of a polymer solution enables one to obtain an accurate measurement of its molecular weight.

A simple and accurate way of avoiding costly engine damage due to diesel fuel contamination is a necessity for owners and operators of heavy duty diesel engines and/or industrial engines. The viscosity changes are the most sensitive to change in liquid composition. It can determine the extent of contamination of one liquid by another such as oil contamination by fuel for the diesel engines of heavy equipment or industrial engines. Although increased engine protection and extended lifetime can be achieved with viscosity measurement of engine oil, inexpensive and accurate field measurements with a small sample amount have proven to be difficult. Current practice requires samples to be sent to the laboratory with added reporting time and analysis cost. Alternative systems and method are desired.

Several methods have been developed to determine the viscosity of fluids. The earliest is the capillary type viscometer, in which a fluid flow is provided through a capillary tube and the drop in pressure across a length of the tube is used to determine the viscosity. This technique suffers from many disadvantages, such as the need for measuring small pressure differences accurately, calibrating the diameter of the capillary tube and keeping the capillary tube clean. Furthermore, it has been found that the capillary tube viscometer is only useful for determining viscosity at high shear rates. It cannot be used to determine viscosity at low shear rates.

A known technique is falling sphere of falling ball viscometer, first described in G. G. Stokes, Camb, Phil. Trans., 9, p. 8 (1851). In this method the viscosity is determined from the time taken for a sphere to fall through a predetermined distance in an infinite fluid. However, in the falling sphere method, the following assumptions are made: (a) the spheres are falling in an infinite medium, and (b) the density of the falling sphere is in a suitable range for the equation used to determine the viscosity to hold true. Furthermore, the falling sphere must be perfectly round, so that it will fall vertically through the fluid and will not veer in one direction or another or fall erratically.

In practice, spheres can only be made from a limited range of materials, such as glass, aluminum, or steel, and their density cannot be adjusted. Further, very few spheres are truly round and, as a consequence, the fall through the fluid medium is often not vertical. Moreover, a fluid must be held in a container. Therefore, the fluid is not, in fact, infinite, and wall effects have to be considered. Thus, inaccuracies arise from the non-Newtonian fluids because of the geometric complexities involved.

Falling cylinder and plunger viscometers have also been designed. See, Lohrentz, et al., A. I. Ch. E. Journal, 6, No. 4, p. 547-549 (1960) and G. S. Smith, J. Inst. Pet., 43, p. 227-230 (1957). Some deficiencies of these viscometers include difficulties in constructing the falling cylinder or plunder; difficulties in obtaining cylinders or plungers with different densities; and difficulties in maintaining a vertical fall through the fluid. Further, the eccentricity effect is very significant. Because of these problems, it is difficult to account for the systematic error in viscosity measurement by the falling cylinder of plunger method.

A rotating cylinder viscometer with two coaxial cylinders, such as a rotating outside cylinder with a stationary inside cylinder, has been developed to measure the viscosity of non-Newtonian fluids. See Van Wazer et al., Viscosity and Flow Measurement, p. 47-96, Interscience Publishers, New York, 1963. However, the rotating cylinder viscometer is difficult and expensive to make because small torque measurements on the stationary spindle are needed for compensation purposes. Further, it is very difficult to maintain a constant temperature in the system and evaporation of the fluid from the open mouth container is unavoidable. These difficulties are often translated into unacceptably large errors in the viscosity measurement obtained.

An apparatus and method for determination of the viscosity of Newtonian and non-Newtonian fluids was disclosed in U.S. Pat. No. 4,637,250, issued Jan. 20, 1987, entitled Apparatus and Method For Viscosity Measurements For Newtonian and Non-Newtonian Fluids, to Irvine and Park (the present inventor). The lab-based apparatus includes a cylinder for holding the fluid for which the viscosity is to be determined; a needle; a needle launcher placed at the top of the cylinder for feeding the needle into the fluid in the cylinder; means at the bottom of the cylinder for collecting the needle; means for maintaining the cylinder, the sample insert tube, and its contents at a constant temperature; and means for measuring the time of fall of the needle between two marks on the wall of the cylinder spaced a predetermined distance. The needle is capable of being adjusted in density, and viscosity is measured by allowing the needle to fall through the liquid in the sample insert tube while maintaining the sample insert tube and its contents at a constant temperature. The time of fall of the needle between the spaced marks on the cylinder is measured. From this measurement and the dimensions of the apparatus, the viscosity can be calculated.

An apparatus and method for determination of the viscosity of Newtonian and non-Newtonian fluids was disclosed in U.S. Pat. No. 5,327,778, issued Jul. 12, 1994, entitled Apparatus and Method For Viscosity Measurements Using a Controlled Needle Viscometer, to Park.

It is desirable to provide alternative apparatus and methods to determine accurately the viscosity of Newtonian and non-Newtonian fluids over a wide range of viscosities and under in-service or field conditions, which are inexpensive, portable, and/or simple to use in relation to prior art systems and methods.

SUMMARY

A portable field viscometer includes a disposable (or reusable) vertical sample insert tube (syringe) filled with the liquid of which the viscosity is to be determined. Viscosity of the sample can be determined by measuring the time of fall of a needle with guide fins on the surface through a predetermined distance of the fluid held in a sample insert tube (syringe). A sealed sample insert syringe can be used for keeping, transferring and/or testing the sample without evaporating problems.

An apparatus and method are disclosed for accurately determining viscosity of Newtonian and non-Newtonian fluids in the field or in-service by using a potable field viscometer. The portable field viscometer includes a vertical disposable (or reusable) sample insert tube filled with the liquid which the viscosity is to be determined. Using fins on the needle surface, a needle having a known density is made to fall through the liquid in the disposable (or reusable) sample insert tube. Using the time that the needle takes to fall between two known distance marks on the extension bar attached the top of the needle or transducers such as light, laser or magnetic, the velocity of the needle falling through the liquid is determined. Thus, the viscosity can be calculated by using the velocity of a needle. In the method, viscosity, shear rate and shear stress can be determined according to the enclosed equations.

According to an aspect of the disclosure, a portable system and method to determine viscosity changes of engine oil by diesel contamination in internal combustion engines under in-service or field conditions has been assessed having enhanced accuracy and usability. Field viscosity measurements were made using the portable field viscometer while changing both the diesel concentration from 2 to 10% and temperature from 15 to 40 degree Celsius. Because of the simplicity of this principle, automatic or manual portable field viscometer is made available for lubricants and greases even under in-service or field conditions without any instrument calibration by using the constant gravity. The viscosity measurements with an automatic and inexpensive manual portable field viscometer are better than 1% and 2% accuracy, respectively. These portable field viscosity measurements not only extend the engine life and usage time of diesel engine oils, but also allow for further elucidation of diesel contamination to engine oils.

According to an embodiment, a needle with guide fins on its surface, hemispherical ends and an extension bar at the top of the needle falls through the test liquid with the longitudinal axes of the needle.

In an embodiment, the needle falling time may be measured by means of one or more marking elements on the support extension bar or the falling needle and measured by using a sensor arrangement operatively associated with the marking elements and configured for measuring the time of the falling needle through a predetermined distance responsive to detection of the one or more marking elements. In embodiments, a timer or clock may be used in connection the sensing and time measurements to be taken in connection with the marking elements, including, by way of non-limiting example, a stop watch (manually) or sensor device such as a light or LED sensor (automatically), laser (automatically) or magnetic sensor (automatically). The effective density can be controlled by adding additional weights to the top of the extension bar for high viscosity and high shear rate measurements. The guide fins on the needle surface may be configured to provide a coaxial concentric descent of the needle through the sampling tube containing the test fluid. Such improvement not only eliminates the need for additional structures positioned above the tube necessary for controlling coaxial motion, but additionally serves to reduce height, weight, and overall dimensionality of the device, thereby adding to the portability and in-service device usage and implementation. In a further embodiment, the needle with the guide fins may be implemented with a plurality (e.g. two or more) markings on the extension bar for the portable field viscometer such that prior art needle guide is not needed. In addition, the apparatus and method accommodates a sealed disposable sample insert syringe for keeping, transferring and testing the sample without an evaporation problem.

In embodiments, a viscometer body can be made from materials such as plastics, aluminum, and/or stainless steel for easy carry-out. An exterior of the viscometer body may include a clip (e.g. a pen-type clip) to allow the viscometer to be carried in a shirt pocket and easily accessed in order to measure viscosities for conducting a field test or for condition monitoring of in-service lubricants or any fluids. The pen-type viscometer body with pen clip may be made of transparent or opaque materials, such as disposable (or reusable) plastic (e.g. epoxy resin, high density polyethylene, polycarbonate, polypropylene, acetal), quartz, or borosilicate glass, synthetic fluoropolymer, PTFE, stainless steel, aluminum or ceramic, by way of non-limiting example.

Using the portable field viscometer, the entire process of obtaining in-service lubricant (e.g. engine oil) viscosities can be measured within only a few minutes. This includes sampling, testing, sample unloading and cleaning. In addition, the sample container can be disposed of without cleaning and the needle can be easily cleaned (e.g. by means of a paper towel). The portable field viscometer can be used in the field as a simple and accurate way of avoiding costly engine damage due to diesel fuel contamination for owners and operators of heavy duty diesel engines and/or industrial engines. Furthermore, the viscometer of the present disclosure has application to other industrial fluids, such as automobile engines, transmissions, turbines including wind turbines, hydraulics, transformers, and grease, by way of non-limiting example. Thus, the portable field viscometer of the present disclosure represents a best fit for conducting a field test or for condition monitoring of in-service lubricants. The portable viscometer is hand-held and can be carried in the field, or in the pocket, in contrast to lab viscometers which do not support such field applications.

The apparatus is simple and easy to use, and equations have been derived for the accurate determination of the viscosity of Newtonian and non-Newtonian fluids for this apparatus.

In general, in a presently preferred form, the apparatus is as follows:

A disposable sample insert tube (syringe), of inside diameter "D" cm, is provided, for holding a sample of the fluid of which the viscosity is to be determined. The surface of the extension bar has a predetermined distance, "F", marked along its vertical axis. A needle with extension bar is made of, for example, one or more of synthetic fluoropolymer, PTFE, glass, titanium, aluminum, stainless steel and ceramic materials, by way of non-limiting example. In an embodiment, the needle has hemispherical ends and has a diameter d (cm), wherein k=d/D is preferably at least about 0.15 and at most about 0.99, and has a length of L (cm), wherein L/D is at least 1.8.

A plurality of guide fins (e.g. 6, 9, or more) are disposed on the surface of the needle and provide coaxial motion of the needle falling through the test liquid with the longitudinal axes of the needle and the disposable sample syringe. The precise needle falling time can be obtained by using these fins, without a needle guide. These fins also make the portable field viscometer more user-friendly. The time of the needle fall may be measured by a variety of measuring techniques, including visual, manual, stopwatch, or by electronic, magnetic or laser or light means.

Various implementations for determining the time measurements may be embodied in accordance with aspects of the present disclosure. For example, in one embodiment, after dropping the needle, the stopwatch is started and then stopped when the bottom and top markings on the extension bar meet the top of the sample insert tube (syringe), respectively. In another embodiment, after dropping the needle, a clock or timer is automatically started and then stopped when the top and bottom light (or laser) photodiodes on the top of the viscometer body meet light (or laser) which may pass through a groove or other indicia on the extension bar. In another embodiment, after dropping the needle, an automatic timer is started and then stopped when top and bottom magnetic (e.g. Hall) sensors on the top of the viscometer body magnetically engage with a magnet in the extension bar, respectively. Further still, in an embodiment dropping the needle with a magnet, an automatic timer is started and then stopped when the top and bottom magnetic (e.g. Hall) sensors on the side of the viscometer body meet the magnet in the needle, respectively. Embodiments may be described with reference to FIG. 1. By way of non-limiting example, after dropping the needle, the stopwatch is started and then stopped when the bottom and top markings on the extension bar 8 meet the top of the sample insert tube (syringe), respectively.

In another embodiment, after dropping the needle, the automatic timer is started and then stopped when the top (sensor c) and bottom (sensor d) light (or laser) photodiodes on the top of the viscometer body meet light (or laser) generated by the sensors a and b, which passes through a groove on the extension bar, respectively.

In another embodiment, after dropping the needle, the automatic timer is started and then stopped when the top (sensor c) and bottom (sensor d) magnetic (e.g. Hall) sensors on the top of the viscometer body meet the magnet in the extension bar, respectively.

In another embodiment, after dropping the needle with a magnet, the automatic timer is started and then stopped when the top (sensor e) and bottom (sensor f) magnetic (e.g. Hall) sensors on the side of the viscometer body meet the magnet in the needle, respectively.

Thus, there is disclosed an apparatus for determining the viscosity of fluids, comprising: a vertically oriented disposable sample insert tube for holding fluid whose viscosity is to be determined, and disposable sample insert tube having a cylindrical wall; a falling needle with at least six guide fins on its surface received in the sample insert tube for axial movement therein, the falling needle comprising an elongated body having hemispherical ends and having an upwardly extending bar coupled to one of the ends in axial alignment with the body, the body having a length of at least about 1.8 times the internal diameter of the sample insert tube; wherein the at least six guide fins on the surface of the falling needle are configured to maintain the needle coaxial with the vertical axis of the sample insert tube to enable measurement of the time of the falling needle through a predetermined distance; one or more marking elements on the support extension bar or the falling needle; and a sensor arrangement operatively associated with the one or more marking elements and configured for measuring the time of the falling needle through a predetermined distance responsive to detection of the one or more marking elements.

In embodiments of the disclosure, the one or more marking elements may comprise a groove or other indicia formed in the extension bar, a magnet disposed on the extension bar or on the needle, or a plurality of visible markings or indicia on the extension bar and spaced apart by a predetermined distance indicative of distance of fall of the falling needle within the sample insert tube.

In embodiments of the disclosure, the sensor arrangement operatively associated with the one or more marking elements and configured for measuring the time of the falling needle through a predetermined distance responsive to detection of the one or more marking elements may comprise a light or laser device arranged for signal detection of a light signal via a groove arranged on the extension bar, a magnetic sensor arranged for detection of a magnetic field from a magnet position on the extension bar or the needle, or detection (e.g. visually or manually) of the time taken to traverse the plurality of markings or indicia on the extension bar spaced apart by distances of fall of the falling needle within the sample insert tube.

In general, in one method aspect, the disclosure involves the steps of:

a. filling the disposable sample insert syringe (tube) with a fluid for which the viscosity is to be determined;
b. inserting the needle with guide fins into the fluid;
c. allowing the needle with guide fins to fall through the fluid sample in the disposable sample insert syringe;
d. measuring the time in "t" seconds taken for the needle with guide fins to fall the predetermined distance marked on the surface of the extension bar; and
e. for Newtonian and non-Newtonian fluids, calculating the viscosity by using the equations described in detail below.

In an embodiment, an apparatus comprising a vertically oriented disposable (or reusable) sample insert tube for holding fluid whose viscosity is to be determined, and a disposable sample insert tube having a cylindrical wall; a falling needle with a plurality of fins on its surface received in the sample insert tube for axial movement therein, the falling needle comprising an elongated body having hemispherical ends and having an upwardly extending bar coupled to one of the ends in axial alignment with the body, the body having a length of at least about 1.8 times the internal diameter of the sample insert tube; wherein the plurality of fins on the surface of the falling needle are configured to maintain the needle coaxial with the vertical axis of the sample insert tube to enable measurement of the time of the falling needle through a predetermined distance.

In an embodiment for use in a cylindrical sample insert tube of inside diameter D, a falling needle for measuring the viscosity of Newtonian and non-Newtonian fluids in the sample insert tube, comprises: an elongated cylindrical body member having rigid side walls and a hemispherical top end portion attached to the support extension bar, means associated with the body member to facilitate adjustment of the density of the needle to adjust the velocity of fall of the needle through the fluid whose viscosity is to be measured, and the body having a length of at least 1.8 D and a diameter such that the ratio of the diameter of the body member to the diameter of the sample insert tube is between about 0.15 to 0.99.

In an embodiment, a method for determining the viscosity of a Newtonian fluid, comprising the steps of: providing a disposable sample insert tube having a inside diameter D; filling the sample insert tube with a fluid for which the viscosity is to be determined; providing a falling needle having a diameter d and a length L, and having attached thereto a bar having a diameter d1, such that the ratio k=d/D is at most about 0.99 and L/D is at least 1.8; inserting the falling needle into the fluid filled sample insert tube; allowing the falling needle to fall through the fluid filled sample insert tube; measuring the time, t seconds, taken for the falling needle to fall a predetermined distance F relative to the surface of the support extension bar; and calculating the viscosity based on the time measurement.

In an embodiment, a method for determining the viscosity of a non-Newtonian fluid of d/D=0.8 to 0.99, comprising the steps of: providing a disposable sample insert tube having a inside diameter D; filling the sample insert tube with a fluid for which the viscosity is to be determined; providing a falling needle having a diameter d and a length L, and having attached thereto a bar having a diameter d1, such that the ratio k=d/D is at most about 0.99 and L/D is at least 1.8; inserting the falling needle into the fluid filled sample insert tube; allowing the falling needle to fall through the fluid filled sample insert tube; measuring the time, t seconds, taken for the falling needle to fall a predetermined distance F relative to the surface of the support extension bar; and calculating the viscosity based on the time measurement.

For the purpose of illustrating aspects of the disclosure, there is shown in the drawings a form of the disclosure which is presently preferred. It should be understood, however, that the disclosure is not limited to the precise arrangements and instrumentalities shown.

BRIEF DESCRIPTION OF THE DRAWINGS

A more detailed understanding may be had from the following description, given by way of example in conjunction with the accompanying drawings wherein.

DETAILED DESCRIPTION

Figure 1:
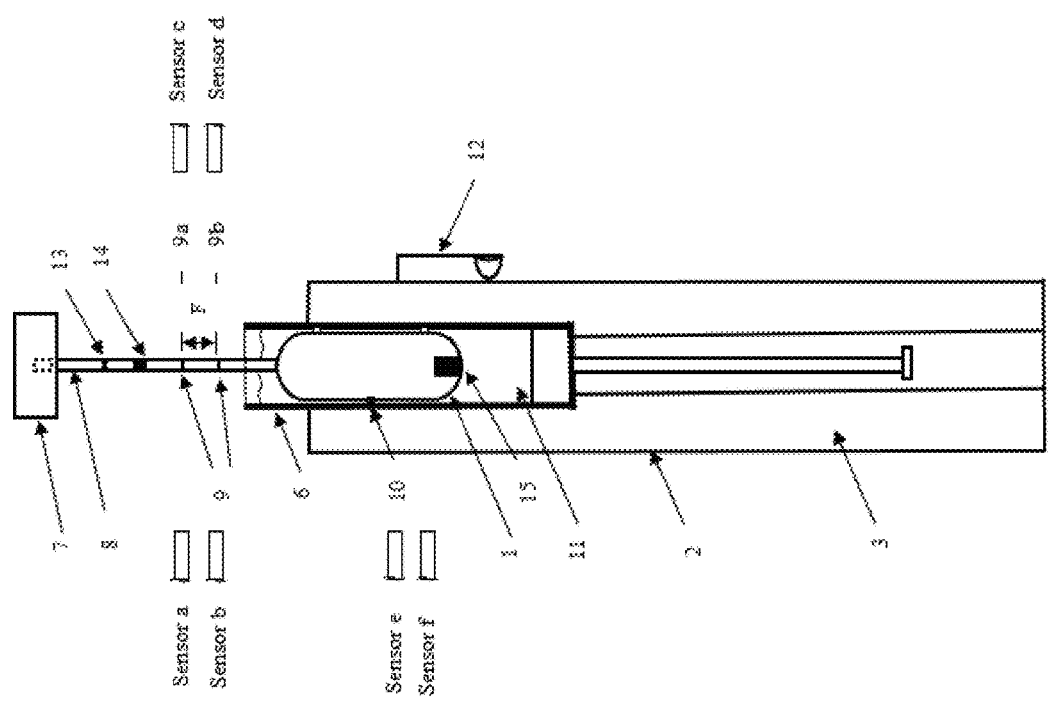
FIG. 1 is a schematic presentation, in side elevation and cut away, of a portable field viscometer in accordance with the present disclosure.

Referring now to the drawings in detail, wherein like elements are designated by like reference numerals, there is seen in FIG. 1 a portable field viscometer designated generally by reference numeral 2. The viscometer 2 includes a viscometer body 3 and a sample insert tube (e.g. syringe) 6 of inside diameter "D" cm, and preferably made of transparent or alternatively, opaque materials, such as disposable (or reusable) plastic (e.g. epoxy resin, high density polyethylene, polypropylene), quartz, or borosilicate glass, synthetic fluoropolymer, PTFE, stainless steel, aluminum or ceramic. The sample insert tube is depicted as containing the sample fluid or liquid, i.e. the fluid or liquid whose viscosity is to be determined. The portable field viscometer 2 may include a pen-type enabled viscometer body having fixedly attached to an outside portion thereof a clip 12. The clip 12 may be oriented as shown in FIG. 1.

A falling needle, designated generally by the reference numeral 1, is depicted within the sample insert tube 6. In an embodiment, the velocity of the falling needle may be determined based on one or more marking elements (e.g. 9a, 9b, 13, 14, 15) which are positioned on the support extension bar 8 or the falling needle 1, and where a sensor arrangement (e.g. sensors a-f or visual/manual sensing) operatively associated with the one or more marking elements measures the time of the falling needle through a predetermined distance responsive to detection of the one or more marking elements.

For example, the velocity of the falling needle may be determined as it passes the marks 9a and 9b on the extension bar 8. In this configuration, measurements may be determined at sensing positions outside of the viscometer body and the sample insert tube, while the falling needle is within tube 6 and body 3. Such apparatus and method advantageously enables various measurement techniques which do not rely on transparency of the body, insert tube, and/or fluid. Measurements may be made according to various means, including but not limited to using a manual stopwatch (e.g. FIG. 1A) or by using automatic sensors such as light, laser (e.g. FIG. 1B) or magnetic devices (e.g. FIGS. 1C and 1D). For purposes of illustration, the needle 1 is shown in FIG. 1 at approximately the point of insertion into the sample liquid. Alternatively, other measurement means such as marks along the wall of the body 3, as in prior art devices such as disclosed in U.S. Pat. No. 5,327,778, may also be configured.

Figure 2:
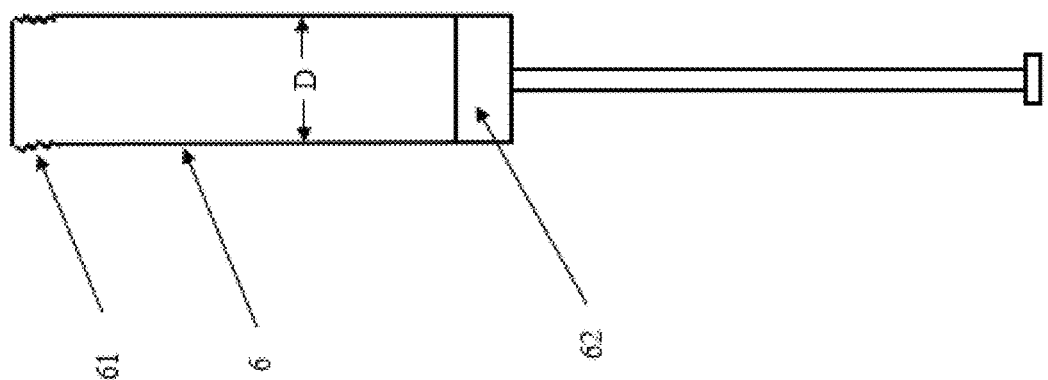
FIG. 2 is a schematic view, in side elevation and cut away, of a disposable sample insert tube (syringe) used in the apparatus shown in FIG. 1.

The disposable (or reusable) sample insert tube (e.g. syringe) 6 as shown in FIGS. 1 and 2 further comprises a top cap thread 61 to facilitate connection of the screw cap, for applying suction to load or remove a fluid sample by using the plunger 62.

Figure 3:
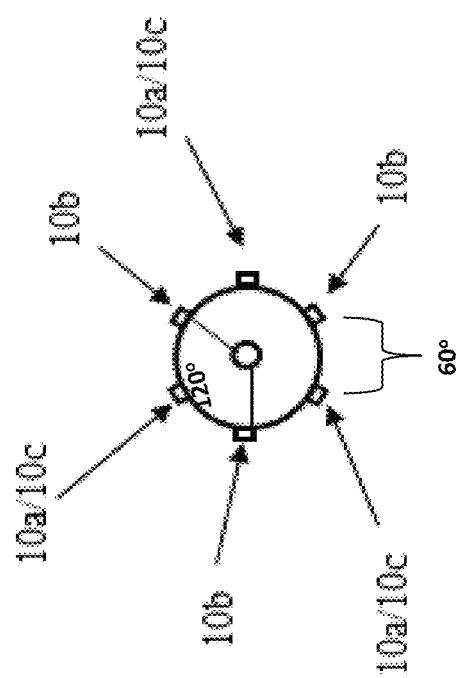
FIG. 3 is a top plan view of a needle used in the apparatus shown in FIG. 1.
Figure 4:
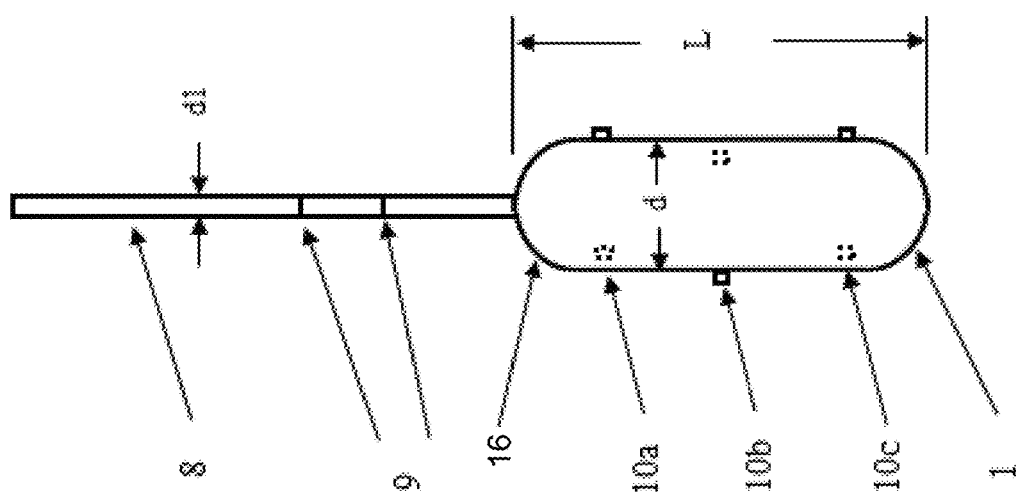
FIG. 4 is a schematic view, in side elevation, of a needle used in the apparatus shown in FIG. 1.

Referring again to FIG. 1 in conjunction with FIGS. 3-4, there is shown a plurality of guide fins positioned about the needle. In a preferred embodiment, three groups of fins, consisting of nine (9) total fins, are designated generally by the reference numeral 10 and located about the surface of the needle. These three groups of three (3) fins each are located at the top, middle and bottom portions of the needle surface as shown in FIG. 3 and FIG. 4. The three fins of each group are installed every 120° for falling the needle vertically. The top and bottom fins are made at the same angle position. The middle fins are made at 60° from the fin starting position of the top and bottom in order to drop the needle vertically. Each of the fins are of uniform configuration (shape) so as to each be of substantially identical length, width, height, thickness, and density. Each of the fins extends from the outer surface of the needle toward the interior wall of sample insert tube 6 within a predetermined tolerance gap (e.g. 0.001 inch (in) to 0.002 in). The top 10a and bottom 10c fin groups are positioned at the respective ends of the top and bottom hemispherical portions of needle 1. Middle fins 10b are located longitudinally equidistant from fin groups 10a, 10c. In another embodiment, 6 fins (3 fins at each of top 10a and bottom 10c fin groups) may be implemented according to an aspect of the disclosure. It is understood that 6 fins as disclosed herein represent a minimum configuration for embodiments of the present disclosure.

Referring now to FIG. 3 and FIG. 4, the falling needle 1 will be described in detail. As shown in FIG. 4, the needle 1 used in the viscometer 2 comprises a solid round bar, preferably made of a material such as acetal, glass, aluminum, stainless steel, titanium or ceramic, and having an outer diameter, d, which is preferably more than 0.15 but no greater than 0.99 times the inside diameter, D, of the sample insert tube 6 and a length, L, at least 1.8 times the inside diameter, D, of the sample insert tube. The falling needle is provided with hemispherical tips 16 and a weight support extension bar, or rod, 8 which serves to support weights 7. The extension bar 8 is threaded, glued or otherwise suitably affixed to the upper tip 16 of the falling needle.

Figure 5:
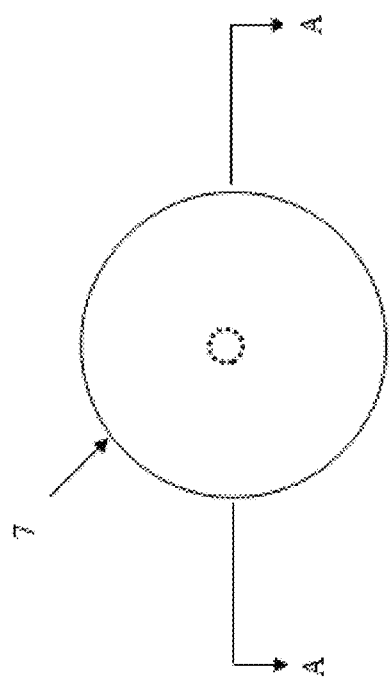
FIG. 5 is a top plan view of a weight used in the apparatus shown in FIG. 1.
Figure 6:
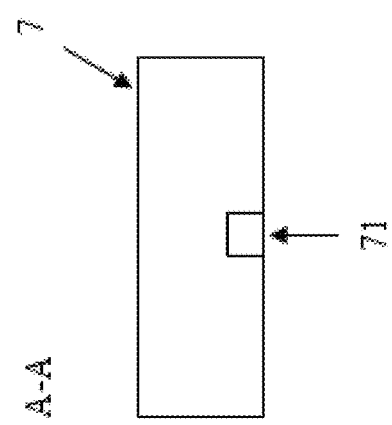
FIG. 6 is a side elevation and cut away of a weight used in the apparatus shown in FIG. 5.

Referring again to FIG. 1 in conjunction with FIGS. 4-6, weights 7 can be applied to the weight support extension bar 8 to adjust the density of the falling needle 1. As shown in FIG. 1, automatic sensors such as light, laser (e.g. sensor a-b, c-d arrangement) or magnetic sensing arrangements (e.g. sensor c-d arrangement, or sensor e-f arrangement), can trigger the timer of the needle falling time measurement system.

In one embodiment (e.g. shown schematically in FIG. 1B), after dropping the needle 1, an automatic timer is started and then stopped when the top sensor c and bottom sensor d photodiodes on the top of the viscometer body 3 detect light (or laser) generated by sensor a and b, which passes through a groove 13 on the extension bar 8, respectively. It is understood that the function of groove 13 on the extension bar 8 is to pass a light (or laser) from light (or laser) sensor a and b to photodiode c and d.

Also, in one embodiment (e.g. shown schematically in FIG. 1C), after dropping the needle 1, the automatic timer is started and then stopped when the top sensor c and bottom sensor d magnetic (e.g. Hall) sensors on the top of the viscometer body 3 detect the magnet 14 in the extension bar 8, respectively. In other words, magnet 14 is disposed on extension bar 8 and of sufficient field strength for detection by magnetic sensors c and d as the magnet 14 passes the respective positions of the sensors, which are fixedly positioned proximate the extension bar on top of the viscometer and at known distances relative to one another.

In another aspect (e.g. shown schematically in FIG. 1D), after dropping the needle 1 with a magnet 15, the automatic timer is started and then stopped when the top sensor e and bottom sensor f magnetic (e.g. Hall) sensors on the side of the viscometer body 3 meet or detect the proximity of the passing magnet 15 in the needle 1, respectively. That is, magnet 15 is disposed in needle 1 and of sufficient field strength for detection by magnetic sensors e and then f as the magnet 15 passes the respective positions of the sensors, which are fixedly positioned proximate the needle on the side of the viscometer and at known distances relative to one another.

Figure 1A:
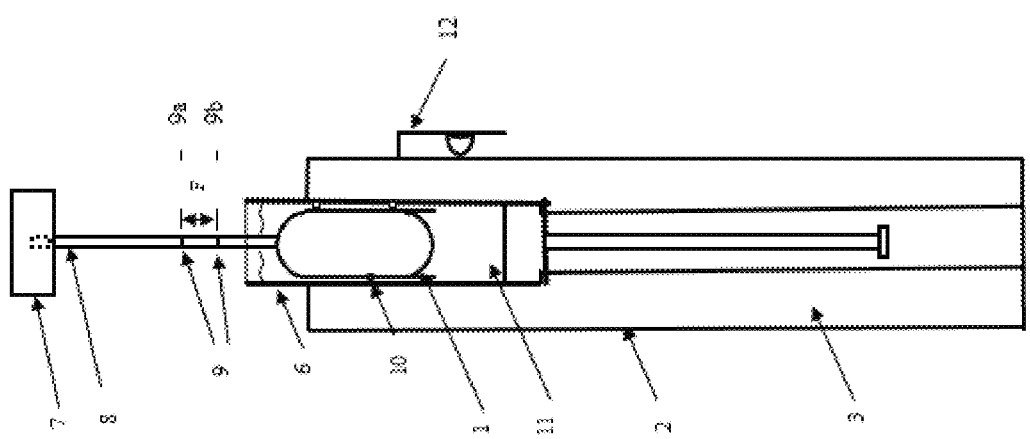
FIG. 1A is a schematic presentation, in side elevation and cut away, of a portable field viscometer having functionality associated with manual measurement processing in accordance with an aspect of the present disclosure.
Figure 1B:
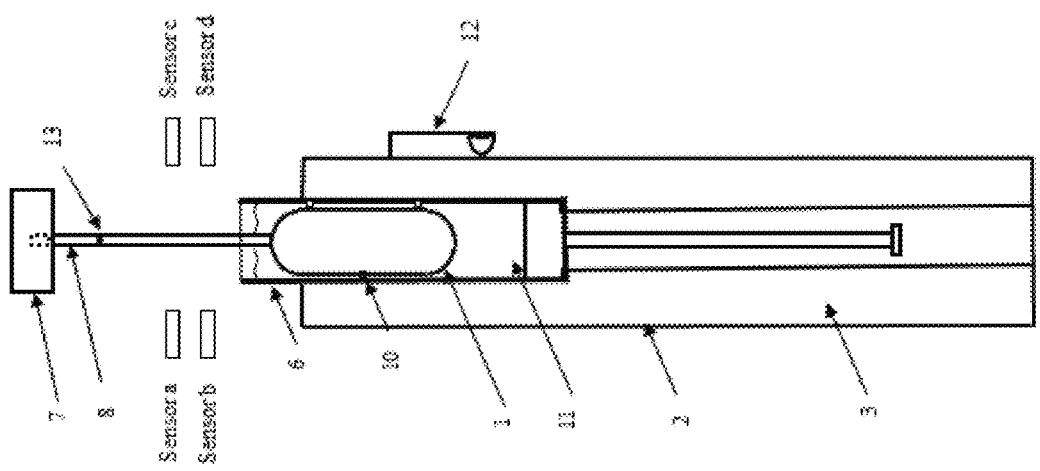
FIG. 1B is a schematic presentation, in side elevation and cut away, of a portable field viscometer having functionality associated with automatic light or laser photodiode measurement processing in accordance with an aspect of the present disclosure.
Figure 1C:
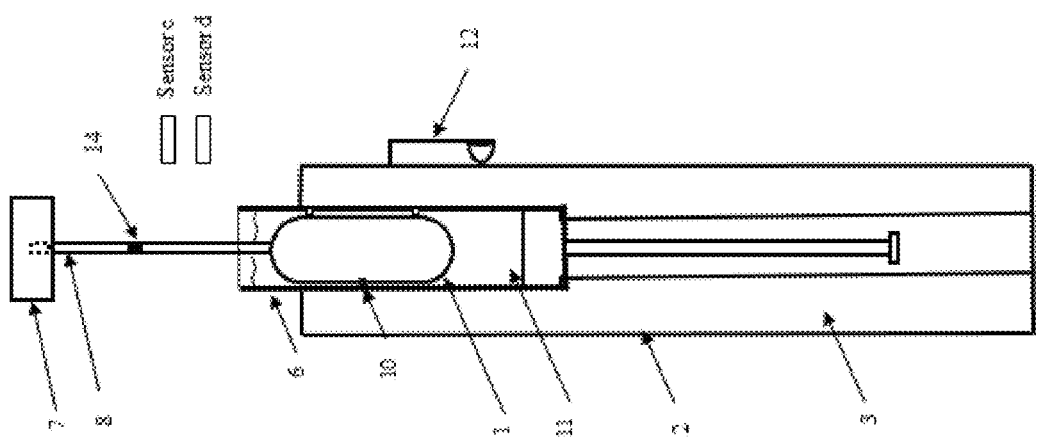
FIG. 1C is a schematic presentation, in side elevation and cut away, of a portable field viscometer having functionality associated with automatic magnetic sensor measurement processing in accordance with an aspect of the present disclosure.
Figure 1D:
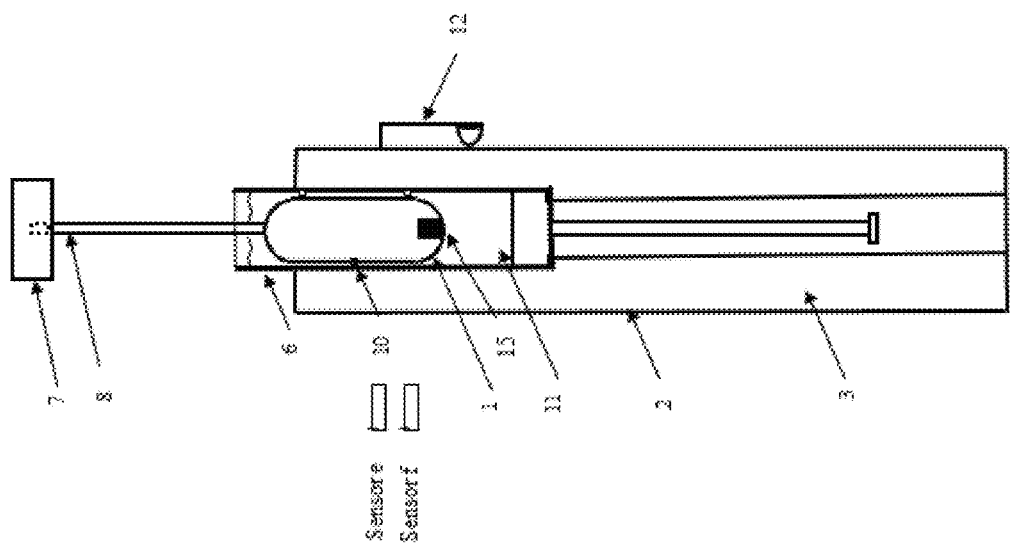
FIG. 1D is a schematic presentation, in side elevation and cut away, of a portable field viscometer having functionality associated with automatic magnetic sensor measurement processing in accordance with another aspect of the present disclosure.

In still another aspect, after dropping the needle 1, a manual stopwatch is started and then stopped when the bottom 9b and top 9a markings on the extension bar 8 meet the top of the sample insert tube (syringe) 6, respectively (FIG. 1A). As shown in FIG. 5 and FIG. 6, the weights 7 may be made of plastic such as synthetic fluoropolymer, PTFE, polycarbonate and acetal, aluminum, stainless steel or ceramic to adjust the needle density, and are provided with partial central openings 71, complemental with the diameter dl of the extension bar 8. The number of weights 7 can be varied selectively for different needles of different desired effective densities.

To determine the viscosity of a liquid, the sample insert tube 6 is filled with the liquid. The weights 7 are added to the weight support extension bar 8 to adjust the effective density of the falling needle 1 with 9 fins on its surface, without a needle guide. It will be understood that as the falling needle 1 falls through sample insert tube 6, the time, "t", in seconds, for the falling needle to fall between two of markings or sensors (as depicted by reference numerals 9a and 9b in FIG. 1) is measured.

For Newtonian fluids, the method of determining viscosity using the above apparatus is as follows:

First, the sample insert tube 6 is filled with a fluid whose viscosity is to be determined;

Next, a falling needle 1 with 9 fins on its surface is inserted into fluid.

The needle is then made to fall through the sample insert tube 6; and the time, t seconds, is measured for the falling needle 1 to fall the predetermined distance F marked on the surface of the support extension bar.

The viscosity, shear rate and shear stress can then be calculated, using the following equations:

Viscosity (mPa·s (cP))

$$\mu = ((\rho_s - \rho_f) * g * 100)/(U_t * G) \text{ (mPa·s (cP))}$$

Shear Rate (1/sec)

$$\gamma = U_t * G * (d/4) * (1 - k^2)/(1 + k^2) \text{ (1/sec)}$$

Shear Stress (mPa)

$$\tau = \mu * \gamma \text{ (mPa)}$$

wherein
d=Needle diameter calibrated (cm)
D=System diameter (cm)
k=d/D
Fl=Falling length (cm)
t=Falling time (sec)
$U_t$=Fl/t (cm/sec)
$\rho_s$=Needle density effective (g/cm$^3$)
$\rho_f$=Fluid density (g/cm$^3$)
g=Gravity constant $L_p$=(Needle length−d)/d
$C_1$=(1+$k^2$)/($k^2$*(1−ln k))
$C_w$=0.9999456−2.08324*$k$−0.2822582*$k^2$+3.392001*$k^3$−2.58148*$k^4$+0.554073*$k^5$
ECF=End correction factor of needle=(1+2/(3*$L_p$))/(1+3/(2*$C_w$*$L_p$*$C_1$))
G=Geometric constant (1/cm$^2$)=8*$C_1$/($d^2$*ECF).

For non-Newtonian fluids, the method of determining viscosity using the above apparatus for an needle outer diameter, d, which is preferably more than 0.8 but no greater than 0.99 times the inside diameter, D, of the sample insert tube is the same as that of Newtonian fluids as follows:

a. First, the sample insert tube 6 is filled with a fluid whose viscosity is to be determined;
b. Next, a falling needle 1 with 9 fins on its surface is inserted into fluid.
c. The needle is then made to fall through the sample insert tube 6; and the time, t seconds, is measured for the falling needle 1 to fall the predetermined distance F marked on the surface of the support extension bar.

The viscosity, shear rate and shear stress can then be calculated, using the following equations:

Viscosity (mPa·s (cP))

$$\mu=((\rho_s-\rho_f)*g*100)/(U_t*G) \text{ (mPa·s (cP))}$$

Shear Rate (1/sec)

$$\gamma=U_t*G*(d/4)*(1-k^2)/(1+k^2) \text{ (1/sec)}$$

Shear Stress (mPa)

$$\tau=\mu*\gamma \text{(mPa)}$$

wherein
d=Needle diameter calibrated (cm)
D=System diameter (cm)
k=d/D
Fl=Falling length (cm)
t=Falling time (sec)
$U_t$=Fl/t (cm/sec)
$\rho_s$=Needle density effective (g/cm$^3$)
$\rho_f$=Fluid density (g/cm$^3$)
g=Gravity constant
$L_p$=(Needle length−d)/d
$C_1$=(1+$k^2$)/($k^2$*(1−ln k))
$C_w$=0.9999456−2.08324*$k$−0.2822582*$k^2$+3.392001*$k^3$−2.58148*$k^4$+0.554073*$k^5$
ECF=End correction factor of needle=(1+2/(3*$L_p$))/(1+3/(2*$C_w$*$L_p$*$C_1$))
G=Geometric constant (1/cm$^2$)=8*$C_1$/($d^2$*ECF).

It can be observed that the portable field viscometer of the present disclosure is suitable for measuring the viscosities of new and used oils for their quality controls and machine performance checks under field or in-service conditions.

Figure 7:
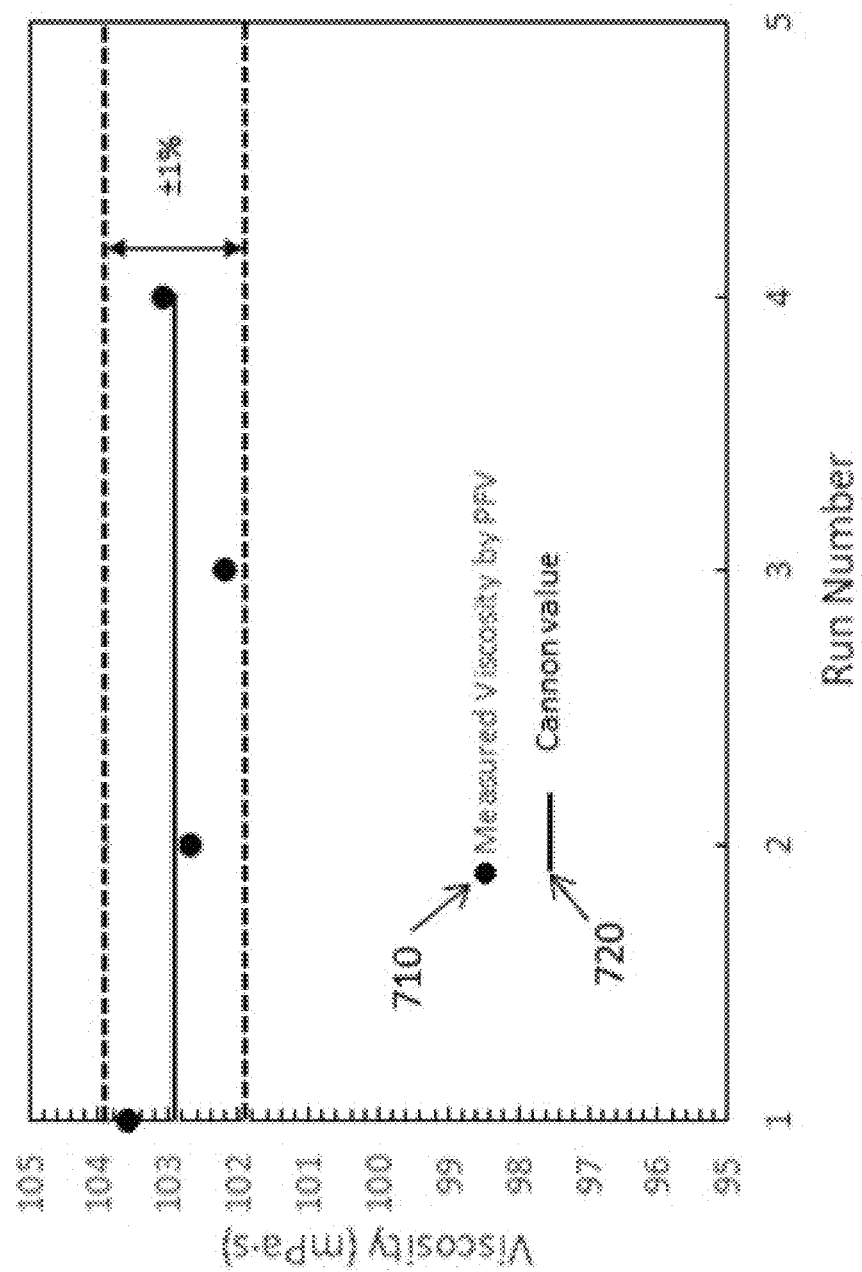
FIG. 7 is a plot of viscosity measured by using the present portable field viscometer (PFV) compared to the viscosity data known of ASTM Standards (Cannon-S 60).
Figure 8:
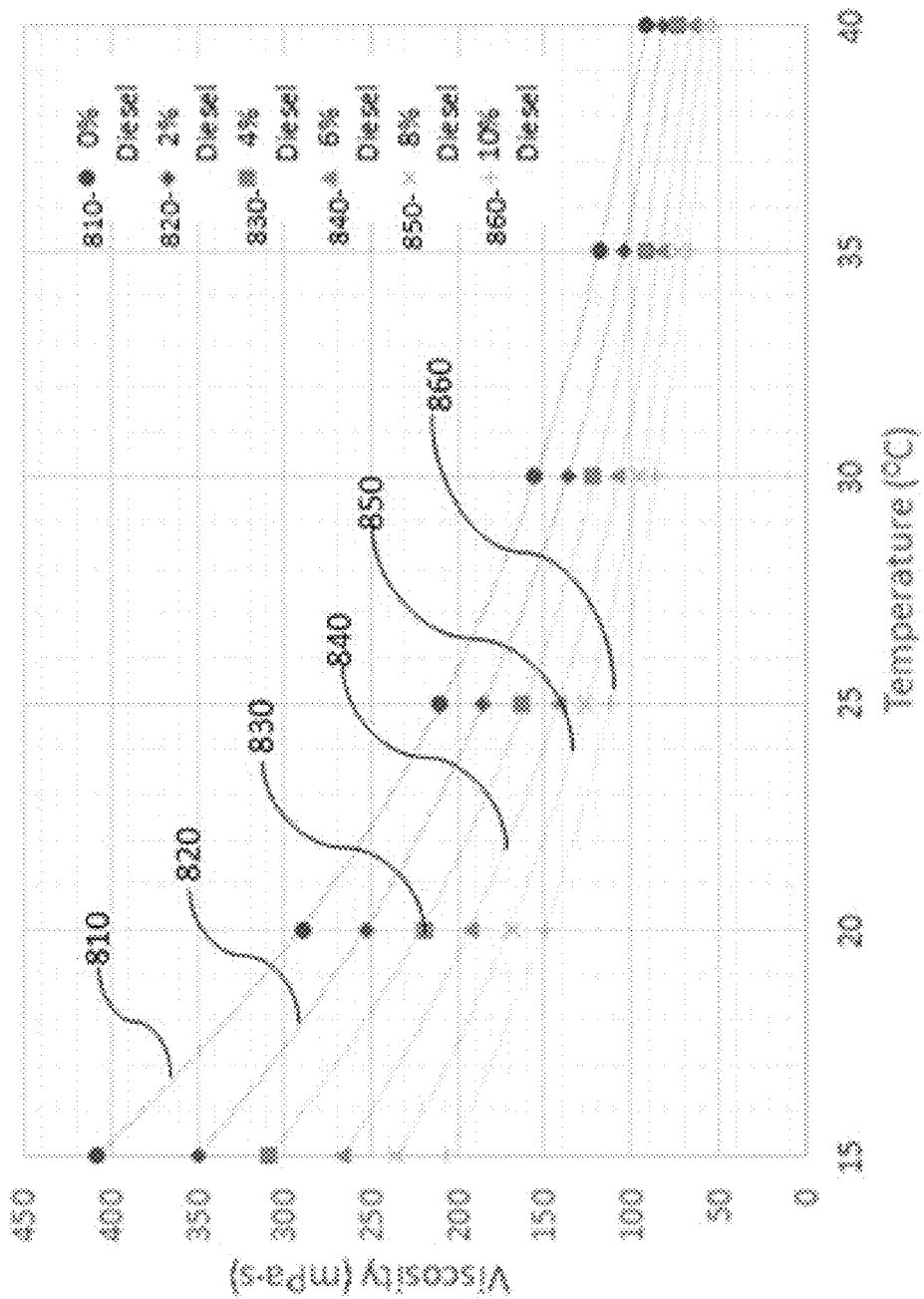
FIG. 8 is a plot of viscosities measured by using the present portable field viscometer for diesel-engine oil mixtures (2 to 10 weight percentages) from 15° C. to 40° C.

FIG. 7 illustrates a plot 710 of viscosity measurements using the portable field viscometer (PFV) of the present disclosure compared to the viscosity data 720 known of ASTM Standards (Cannon-S 60). As shown, the viscosity deviation is minimal (+/−1%). FIG. 8 shows plots (810-860) of viscosities measured by using the portable field viscometer of the present disclosure for diesel-engine oil mixtures (0 to 10 weight percentage increments) as a function of temperature (from 15° C. to 40° C.).

From the forgoing, advantages of the present apparatus and method over prior art controlled needle viscometers should now be apparent, non-limiting examples of which include:

1. The apparatus, portable pen type with a clip, is small enough to carry around in field or in-service measurement.
2. The sample insert tube (e.g. syringe) 6 is disposable. Thus the cleaning time can be greatly reduced. The falling needle 1 can be easily cleaned (e.g. with a paper towel).
3. The disposable sample insert syringe 6 can be sealed to prevent the sample from its evaporating during the transfer and storage.
4. The needle 1 falls vertically without a separate needle guide as the needle is guided by the fins 10 (of 6, 9, or more fins) positioned on the surface of the needle and the weight 7 or the weights or electric or magnetic forces at the top of the needle are concentric with the bar. A total of 6, 9 or more fins on the surface of needle operate to improve motion precision without a needle guide. In a preferred embodiment, the 9 fins configured in 3 groups of 3 and oriented as disclosed herein provide optimal motion without degradation due to friction caused by adding additional fins.
5. By using two markings 9 on the support extension bar 8 at the top of the needle 1, the needle falling time between two markings 9 can be manually measured for even opaque samples. Also, light, LED, laser or magnetic (e.g. Hall) sensors can be used for automatic sensing and determination of needle falling time.
6. Without temperature measurement, the viscosity change between new and used oils can be detected with two oil viscosity measurements together.
7. Extra weights 7 can make wide viscosity range and shear rate measurements possible.
8. Simple equation for any Newtonian fluids and non-Newtonian fluids of d/D=0.8 to 0.99.

Thus there is disclosed an apparatus comprising: a vertically oriented disposable sample insert tube for holding fluid whose viscosity is to be determined, and a disposable sample insert tube having a cylindrical wall; a falling needle with a plurality of fins on its surface received in the sample insert tube for axial movement therein, the falling needle comprising an elongated body having hemispherical ends and having an upwardly extending bar coupled to one of the ends in axial alignment with the body, the body having a length of at least about 1.8 times the internal diameter of the sample insert tube; wherein the plurality of fins on the surface of the falling needle are configured to maintain the needle coaxial with the vertical axis of the sample insert tube to enable measurement of the time of the falling needle through a predetermined distance. In an embodiment, the apparatus further comprises markings on a support extension bar connected to an end of the falling needle, the markings being spaced by predetermined distances indicative of distance of fall of the falling needle within the sample insert tube. In an embodiment, the plurality of fins on the surface of the falling needle include at least six guide fins positioned along the surface of the elongated body such that a first set of three guide fins are disposed along the surface of the elongated body at an end point of the first hemispherical end, and a second set of three guide fins are disposed along the surface of the elongated body at an end point of the second hemispherical end longitudinally remote from the first hemispherical end, the three guide fins of each set being installed at 120° separation vertically about the elongated body. In a further embodiment, the elongated body has nine total guide fins, wherein a third set of three guide fins are disposed along the surface of the elongated body at a central position longitudinally on the elongated body and between the first and second sets, the three guide fins of the third set installed at 120° separation vertically about the elongated body and at 60° offset from the guide fin positions of the first and second sets.

In an embodiment, an apparatus for determining the viscosity of fluids, comprises a vertically oriented disposable sample insert tube (syringe) for holding fluid whose viscosity is to be determined, and disposable sample insert tube having a cylindrical wall; a falling needle with at least six guide fins on its surface received in the sample insert tube for axial movement therein, the falling needle comprising an elongated body having hemispherical ends and having an upwardly extending bar coupled to one of the ends in axial alignment with the body, the body having a length of at least about 1.8 times the internal diameter of the sample insert tube; wherein the at least six guide fins on the surface of the falling needle are configured to maintain the needle coaxial with the vertical axis of the sample insert tube to enable measurement of the time of the falling needle through a predetermined distance. In an embodiment, markings are on the support extension bar spaced apart by a predetermined distance indicative of distance of fall of the falling needle within the sample insert tube, and a sensor arrangement is operatively associated with the markings and configured for measuring the time of the falling needle through the predetermined distance.

In an embodiment, the apparatus further comprises a weight support associated with the extension bar, whereby weight may selectively be applied to the falling needle. In an embodiment, the diameter of the body is equal to or less than 0.99 times the internal diameter of the sample insert tube. In an embodiment, the diameter of the body is configured to be about 0.05 to 5.0 cm and the length of the body is about 0.1 cm to 30 cm. In an embodiment, the sensor arrangement comprises a light sensor device, a laser device, or a magnetic sensing device, and a timer or clock for measuring or determining the fall time of the needle. In a further embodiment, a clip is fixedly attached to an outer surface of the body for attaching to a wearable item of a user. The pen clip body may be made of one or more of epoxy resin, high density polyethylene, polycarbonate, polypropylene, acetal, quartz, or borosilicate glass, synthetic fluoropolymer, PTFE, stainless steel, aluminum or ceramic materials.

In an embodiment for use in a cylindrical sample insert tube of inside diameter D, a falling needle for measuring the viscosity of Newtonian and non-Newtonian fluids in the sample insert tube, comprises: an elongated cylindrical body member having rigid side walls and a hemispherical top end portion attached to a support extension bar, means associated with the body member to facilitate adjustment of the density of the needle to adjust the velocity of fall of the needle through the fluid whose viscosity is to be measured, where the body has a length of at least 1.8 D and a diameter such that the ratio of the diameter of the body member to the diameter of the sample insert tube is between about 0.15 to 0.99. In another embodiment, the diameter of the body member is about 0.05 to 5.0 cm and its length is about 0.1 to 30 cm. In another embodiment, the diameter of the body member is about 1 cm and length of the body is about 3 cm, the diameter of the extension bar is about 0.2 cm, and the length is about 8 cm (which is the depth of the sample insert tube plus 2.5 cm, subtracting the length of the needle). In an embodiment, the means associated with the body member comprises an extension bar coupled to one end of the body member in axial alignment with the body member, the extension bar being adapted to receive weights externally of the body member, whereby the effective density of the falling needle may be adjusted.

The apparatus is very simple and easy to use in field or in-service condition, and equations for the accurate determination of viscosity for Newtonian and non-Newtonian fluids from the data collected by the apparatus have been derived.

In an embodiment, a method for determining the viscosity of a Newtonian fluid or a non-Newtonian fluid with a needle outer diameter, d, which is more than 0.8 but no greater than 0.99 times the inside diameter, D, of the sample insert tube, comprising the steps of: filling a sample insert tube having a inside diameter D with a fluid for which the viscosity is to be determined; providing a falling needle having a diameter d and a length L, and having attached thereto a bar having a diameter d1, such that the ratio k=d/D is at most about 0.99 and L/D is at least 1.8; inserting the falling needle into the fluid filled sample insert tube; allowing the falling needle to fall through the fluid filled sample insert tube; measuring the time taken for the falling needle to fall a predetermined distance F relative to the surface of the support extension bar; and calculating the viscosity based on said time measurement. In an embodiment, the method further includes adjusting the weight of the falling needle by applying needle weights external of the needle to control the velocity of the needle through the fluid.

In an embodiment, the method of calculating the viscosity, shear rate and shear stress are performed by means of the following equations:

Viscosity (mPa·s (cP))

$$\mu = ((\rho_s - \rho_f) * g * 100)/(U_t * G) \text{ (mPa·s (cP))}$$

Shear Rate (1/sec)

$$\gamma = U_t * G * (d/4) * (1-k^2)/(1+k^2) \text{ (1/sec)}$$

Shear Stress (mPa)

$$\tau = \mu * \gamma \text{ (mPa)}$$

wherein
d=Needle diameter calibrated (cm)
D=System diameter (cm)
k=d/D
Fl=Falling length (cm)
t=Falling time (sec)
$U_t$=Fl/t (cm/sec)
$\rho_s$=Needle density effective (g/cm$^3$)
$\rho_f$=Fluid density (g/cm$^3$)
g=Gravity constant
$L_p$=(Needle length−d)/d
$C_1 = (1+k^2)/(k^2*(1-\ln k))$
$C_w = 0.9999456 - 2.08324*k - 0.2822582*k^2 + 3.392001*k^3 - 2.58148*k^4 + 0.554073*k^5$
ECF=End correction factor of needle=$(1+2/(3*L_p))/(1+3/(2*C_w*L_p*C_1))$
G=Geometric constant (1/cm$^2$)=$8*C_1/(d^2*ECF)$.

In a further embodiment, contamination rates (e.g., percentages) of foreign materials (e.g., fuel, ethylene glycol, soot, etc.) to the lubricants (e.g., engine oil, grease, transmission oil, transformer oil, hydraulic fluid, etc.) are determined based on the viscosity (or the needle falling time) and the temperature.

The present invention may be embodied in other specific forms without departing from its spirit or essential attributes. Accordingly, reference should be made to the appended claims, rather than the foregoing specifications as indicating the scope of the invention.

Although the methods and features described above with reference to the figures are described above as performed using the example architectures of FIGS. 1 and 1A-1D and the exemplary structures and system of FIGS. 2-8, the methods and features described above may be performed using other appropriate architectures and/or viscosity computing environments. Although features and elements are described above in particular combinations, each feature or element can be used alone or in any combination with or without the other features and elements. For example, each feature or element as described with reference to the figures may be used alone without the other features and elements or in various combinations with or without other features and elements. Sub-elements of the methods and features described above with reference to the figures may be performed in any arbitrary order (including concurrently), in any combination or sub-combination.

The invention claimed is:

1. An apparatus for determining the viscosity of fluids, comprising:
a vertically oriented disposable sample insert tube insertable into a viscometer body and adapted for holding fluid whose viscosity is to be determined, said disposable sample insert tube having a cylindrical wall;
a falling needle with at least six guide fins on its outer surface received in said sample insert tube for axial movement therein, said falling needle comprising an elongated body having hemispherical ends and having an upwardly extending support extension bar coupled to one of said ends in axial alignment with said body;
wherein said at least six guide fins on the surface of the falling needle are configured to maintain said needle coaxial with a central vertical axis that extends through the center of said sample insert tube;
one or more marking elements on said support extension bar or said falling needle to enable measurement of the time of the falling needle through a predetermined distance; and
a sensor arrangement operatively associated with said one or more marking elements and configured for measuring the time of the falling needle through a predetermined distance responsive to detection of said one or more marking elements;
wherein said at least six guide fins are positioned along the outer surface of the elongated body such that a first set of three guide fins are disposed along the outer surface of the elongated body proximal the first hemispherical end; and a second set of three guide fins are disposed along the surface of the elongated body proximal the second hemispherical end longitudinally remote from the first hemispherical end; wherein said three guide fins of each set are installed at 120° separation vertically about the elongated body.

2. The apparatus of claim 1, further comprising a weight support associated with said support extension bar, whereby weight may selectively be applied to said falling needle.

3. The apparatus of claim 1, wherein said elongated body has nine total guide fins, and wherein a third set of three guide fins are disposed along the surface of the elongated body at a central position longitudinally on the elongated body, said three guide fins of said third set installed at 120° separation vertically about the elongated body and at 60° offset from the guide fin positions of the first and second sets.

4. The apparatus of claim 3, wherein said third set of guide fins is located longitudinally equidistant from the first and second sets of guide fins.

5. The apparatus of claim 1, wherein the sensor arrangement includes a clock and at least one of a light or laser configured to detect a light signal through a groove on the support extension bar of the falling needle, or a magnetic sensor device configured to detect a magnetic signal from a magnet disposed on the falling needle or on the support extension bar of the falling needle.

6. The apparatus of claim 5, wherein the sensor arrangement includes said clock and a light or laser configured to detect a light signal through a groove on the support extension bar of the falling needle.

7. The apparatus of claim 5, wherein the sensor arrangement includes said clock and a magnetic sensor device configured to detect a magnetic signal from a magnet on the falling needle or on the support extension bar of the falling needle.

8. The apparatus of claim 7, wherein the magnet is on the support extension bar of the falling needle.

9. The apparatus of claim 1, further comprising a clip fixedly attached to an outer surface of the viscometer body for attaching to a wearable item of a user, the clip having a body made of one or more of epoxy resin, high density polyethylene, polycarbonate, polypropylene, acetal, quartz, or borosilicate glass, synthetic fluoropolymer, PTFE, stainless steel, aluminum or ceramic materials.

10. The apparatus of claim 1, wherein said one or more marking elements comprises a plurality of markings on said support extension bar and spaced apart by a predetermined distance indicative of distance of fall of said falling needle within said sample insert tube.

11. The apparatus of claim 1, wherein said elongated body has a length of at least about 1.8 times the internal diameter of said sample insert tube.

12. The apparatus of claim 11, wherein the diameter of said elongated body is equal to or less than 0.99 times the internal diameter of said sample insert tube.

13. The apparatus of claim 12, wherein the diameter of said elongated body is configured to be about 0.05 to 5.0 cm and the length of the body is about 0.1 cm to 30 cm.

14. The apparatus of claim 1, wherein each of said at least six guide fins have substantially the same density and length, width, height, and thickness dimensions.

15. The apparatus of claim 1, wherein each of said at least six guide fins is configured to extend from the outer surface of the needle toward the cylindrical wall to within a predetermined tolerance gap.

16. An apparatus for determining the viscosity of fluids, comprising:
a vertically oriented disposable sample insert tube insertable into a viscometer body and adapted for holding fluid whose viscosity is to be determined, said disposable sample insert tube having a cylindrical wall;
a falling needle with at least six guide fins on its outer surface received in said sample insert tube for axial movement therein, said falling needle comprising an elongated body having hemispherical ends and having an upwardly extending support extension bar coupled to one of said ends in axial alignment with said body;
wherein said at least six guide fins on the surface of the falling needle are configured to maintain said needle coaxial with a central vertical axis that extends through the center of said sample insert tube;
one or more marking elements on said support extension bar to enable measurement of the time of the falling needle through a predetermined distance; and
a sensor arrangement operatively associated with said one or more marking elements and configured for measuring the time of the falling needle through a predetermined distance responsive to detection of said one or more marking elements;

wherein said one or more marking elements comprises a groove formed in said support extension bar, and wherein said sensor arrangement comprises a light sensor device responsive to a light signal passing through said groove for automatically triggering measurement of the time of the falling needle through the predetermined distance.

17. The apparatus of claim 16, wherein said sensor arrangement comprises a laser device positioned above the viscometer body and comprising a pair of laser transmitter sensors fixedly spaced relative to one another and to a corresponding pair of photodiodes for triggering the start and stop times based upon detection of a light signal through the groove on the support extension bar of said falling needle.

18. The apparatus of claim 16, wherein said elongated body has a length of at least about 1.8 times the internal diameter of said sample insert tube.

19. An apparatus for determining the viscosity of fluids, comprising:
   a vertically oriented disposable sample insert tube insertable into a viscometer body and adapted for holding fluid whose viscosity is to be determined, said disposable sample insert tube having a cylindrical wall;
   a falling needle with at least six guide fins on its outer surface received in said sample insert tube for axial movement therein, said falling needle comprising an elongated body having hemispherical ends and having an upwardly extending support extension bar coupled to one of said ends in axial alignment with said body;
   wherein said at least six guide fins on the surface of the falling needle are configured to maintain said needle coaxial with a central vertical axis that extends through the center of said sample insert tube;
   one or more marking elements on said support extension bar to enable measurement of the time of the falling needle through a predetermined distance; and
   a sensor arrangement operatively associated with said one or more marking elements and configured for measuring the time of the falling needle through a predetermined distance responsive to detection of said one or more marking elements;
   wherein said one or more marking elements comprises a magnet in said support extension bar, and wherein said sensor arrangement comprises a magnetic sensing device for automatically triggering measurement of the time of the falling needle through the predetermined distance upon detection of said magnet.

20. The apparatus of claim 19, wherein said magnetic sensing device comprises Hall effect sensors positioned above the viscometer body and proximate the support extension bar at known distances relative to one another.

21. The apparatus of claim 19, wherein said elongated body has a length of at least about 1.8 times the internal diameter of said sample insert tube.

* * * * *